United States Patent Office 2,754,265
Patented July 10, 1956

2,754,265

OIL BASE DRILLING FLUIDS

Raymond W. Hoeppel, La Habra, Calif., assignor to Ken Corporation, Long Beach, Calif., a corporation of California No Drawing. Application April 3, 1953,
Serial No. 346,799

17 Claims. (Cl. 252—8.5)

This invention relates to drilling fluid compositions, such as are employed in drilling oil and gas wells, and in particular concerns drilling fluids of the oil- or emulsion-base type.

In drilling oil or gas wells by means of rotary drilling tools, a hollow drill pipe known as a drill stem having a bit attached to its lower end is extended downwardly through the well bore and rotated while the bit is pressed against the working face in the formation at the bottom of the hole. The action of the rotating bit grinds away the formation as the drilling progresses. During the drilling, a fluid body known as a drilling fluid or mud is continuously circulated downwardly through the drill stem, through the bit, and against the working face of the hole, and then upwardly to the surface through the annular space between the drill stem and the wall of the bore hole. The drilling fluid serves a number of purposes, among which are cooling and lubricating the drill bit, suspending and removing cuttings from the hole, preventing the flow of liquids from the formations traversed by the bore into the same by applying hydrostatic pressure to such formations, and fulfilling other requirements.

In locations where the underground formations traversed and/or penetrated by the bore contain materials such hydratable clays which swell and/or disintegrate in the presence of water, it has become customary to employ drilling fluids which are either substantially free of water or contain water as the internal phase of a water-in-oil emulsion. These types of fluids are termed "oil base" and "emulsion base" fluids, respectively, although the oil base fluids almost invariably contain small amounts of water and are hence, strictly speaking, also emulsions. In addition to the base liquid, these drilling fluids contain minor proportions of various agents adapted to impart special properties to the composition, e. g., wall-building agents, such as clay or asphalt, to coat or plaster the walls of the bore with a fluid-impermeable layer; weighting agents which serve to increase the apparent density of the composition; dispersing agents which serve to maintain the solid components uniformly dispersed in the liquid base medium; viscosity modifiers; gel strength agents; hydration inhibitors; etc.

Among the various properties requisite to a satisfactory drilling fluid, that of coating the walls of the bore with a thin impermeable solid layer is one of the most important. Such layer serves to prevent loss of the drilling fluid into porous formations traversed by the bore. As previously mentioned, this property may be attained by including in the composition a relatively small proportion, e. g., 0.1–10 per cent by weight, of a clay such as bentonite or an asphaltic material. The effectiveness of such agent in preventing escape of the fluid into permeable formations is conveniently measured by determining the so-called "filtration rate" or "fluid loss value." Such determination consists of a simple filtration test wherein a sample of the drilling fluid is forced against a permeable membrane or filter under standardized conditions of temperature and pressure. The quantity of filtrate obtained after a given period of time is taken as the filtration rate value, usually expressed in milliliters/hour. Detailed procedure for making this determination is set forth in "Recommended Practice on Field Procedure for Testing Drilling Fluids," API Code No. 29, July 1942. Since the fluid loss value of a driling fluid may vary considerably with temperature, it should be determined at a temperature which is at least as high as that which will be encountered in the bore hole. In the standard fluid loss test a pressure of 100 p. s. i. is employed. In some of the following tests a pressure of 1000 p. s. i. was employed.

A second property which is desirable in drilling fluids is that of thixotropic gel strength, i. e., the property of being relatively fluid during agitation but capable of setting up into a gel-like body when allowed to stand quiescent. This property permits cuttings to remain suspended in the fluid when circulation is stopped, but still allows the fluid to be readily circulated. Usually, the gel strength properties of drilling fluids are determined with the aid of a Stormer viscosimeter as described in the aforementioned API Code No. 29. The initial gel strength is determined as the force in grams necessary to produce ⅛ turn of the viscosimeter rotor from a stationary position immediately after agitating the fluid, and is preferably as low as possible, e. g., 0–1 gram. The 10-minute gel strength value is determined in the same manner, after the fluid has been allowed to stand quiescent for 10 minutes, and is preferably of the order of 1–3 grams. In some cases lower 10-minute gel strength values are satisfactory or even desirable.

Among the many types of oil or emulsion base fluids which have been proposed, those described in U. S. Patents Nos. 2,542,020 and 2,607,731 have met with outstanding commercial success. These fluids are characterized in comprising a particular type of dispersing agent which contributes greatly towards desirable fluid loss and gel strength characteristics, said dispersing agent apparently being the reaction product of an alkaline-earth metal base and an alkali-metal alkali partial saponification product of a heat-treated rosin. Two particular types of saponified rosin products are especially preferred, and either type may be used alone or in combination with the other. The first of such types comprises the alkali-metal alkali partial saponification product of wood or gum rosin which has been heat-treated under conditions of time and temperature sufficient to raise its specific rotation to a value above about +5° and to effect a substantial degree of decarboxylation, said product containing between about 1 and about 15 per cent by weight of free resin acids. This type of product is for convenience referred to herein as "partialy saponified decarboxylated rosin." A particularly preferred product of this type is that obtained by saponifying with aqueous potassium hydroxide a wood rosin which has been heated at temperatures between about 250° and about 350° C. for a length of time sufficient to raise its specific rotation to a value above about +5° and to effect a substantial degree of decarboxylation, and comprises between about 45 and about 55 per cent by weight of potassium resin acid soaps, between about 30 and about 35 per cent by weight of unsaponifiable materials, between about 5 and about 10 per cent by weight of free resin acids, and between about 5 and about 10 per cent by weight of water.

The second of the preferred types of saponified rosin products comprises the alkali-metal alkali partial saponification products of rosin which has been heated in the presence of a hydrogenation catalyst, but in the absence of added hydrogen, under conditions of time and temperature sufficient to raise its specific rotation to a value above about +5°, said product containing between about 1 and about 15 per cent by weight of free resin acids. This type of product is for convenience referred to herein as "partially saponified disproportionated rosin" since the heat-treatment in the presence of the hydrogenation catalyst effects a change in the relative proportion of abietic-type acids present in the rosin. A particularly preferred product of this type is that prepared by heating rosin at a temperature between about 225° and about 300° C. for about 15 to about 60 minutes in the presence of a palladium hydrogenation catalyst, but in the absence of added hydrogen, distilling the resulting product and collecting a fraction distilling at about 210–275° C. under about 5–10 mm. pressure, and thereafter saponifying such fraction in the known manner with such a deficiency of aqueous sodium hydroxide that the saponified product has an acid number of about 15–16. Such product is available commercially under the trade-name "Dresinate 731."

The first of the above types of saponified rosin products is noted for its ability to impart excellent fluid loss properties to the drilling fluid, whereas the second is noted for its ability to improve gel strength. As is disclosed and claimed in U. S. Patent No. 2,607,731, the advantages of both may be attained by employing a mixture of the two types.

While drilling fluids comprising the above types of saponified modified rosins have met with considerable commercial success it has been noted that, in some instances, their excellent fluid loss properties are attained only after a so-called "breaking-in" period during which the fluid is circulated within the bore hole. Thus, when these fluids are employed in relatively shallow wells wherein the bottom hole temperature is relatively low, e. g., below about 140° F., or when the base oil is deficient in asphaltic components, it has been found that the desirable low fluid loss value is attained only upon circulating the fluid within the well bore for a period of 3 days or more. Also, this type of fluid has been found to be somewhat sensitive to water contamination, so that it is desirable to maintain the water content at a relatively low value, e. g., below about 15 per cent. Finally, the application of this type of fluid has been somewhat limited by the fact that it contains a hydratable clay such as bentonite, since in certain fields it is considered desirable to avoid introducing hydratable clays into the bore hole.

It is accordingly an object of the present invention to provide a means whereby the ultimate low fluid loss values of the aforementioned type of drilling fluid can be attained immediately upon preparation of the fluid and without the necessity of a "break-in" period.

Another object is to provide a means for increasing the water tolerance of such type of drilling fluid, and thus, among other advantages, provide a means for reducing its cost by the deliberate addition of water.

A further object is to provide a drilling fluid having good fluid loss characteristics and being substantially free of hydratable clays.

A still further object is to provide improved drilling fluids comprising partial saponification products of heat-treated rosins.

Other objects will be apparent from the following detailed description of the invention, and many advantages not specifically referred to herein will occur to those skilled in the art upon employment of the invention in practice.

I have now found that the above and related objects may be realized through the incorporation into the drilling fluid of a minor amount of a water-soluble salt of a heavy metal. More particularly, I have found that drilling fluids prepared by dispersing water, an alkaline-earth metal base, an alkali-metal alkali saponification product of heat-treated rosin, and a water-soluble heavy metal salt in a mineral oil base have excellent fluid loss properties which are attained immediately upon preparation of the composition and without the aforementioned "break-in" period of circulation. In addition, such fluids have a high tolerance for water, and may comprise as much as 50 per cent by weight of water. They are also relatively insensitive to the presence of inorganic salts such as sodium or calcium chloride, and if desired they may comprise such a salt for the purpose of inhibiting the hydration of hydratable clays encountered during drilling. Also, through the use of a heavy metal salt in accordance with the invention, excellent fluid loss properties may be attained without the use of hydratable clays, although the latter may be included in the composition if desired.

The invention in its simplest embodiment thus consists in oil or emulsion base drilling fluids prepared by dispersing in mineral oil minor proportions each of heat-treated rosin which has been partially saponified with an alkali-metal alkali, an alkaline-earth metal base, a water-soluble salt of a heavy metal, and water. An hydratable clay and/or a water-soluble alkali-metal or alkaline-earth metal salt may optionally be included. These compositions are complex colloidal systems whose exact chemical composition is made uncertain by the fact that certain of the components react with each other to an unknown extent. Accordingly, they are herein described and claimed by their method of preparation rather than in terms of their chemical composition which at best can be only speculative.

COMPONENTS

The base oil which usually forms the major component of the new compositions is preferably of mineral origin, and may be crude petroleum or a distillate or residuum material. Preferably, such oil contains a substantial proportion of asphaltenes, polymeric bodies and the like. Heavy oils such as light tars, cracked residua, heavy extracts, and the like are especially well suited, particularly when blended with a light distillate such as gas oil, diesel fuel, etc. A highly satisfactory mixed oil of this type comprises a major proportion, e. g., 60–90 per cent, of a relatively heavy oil such as a light residual oil having a specific gravity of about 13–15° API and a viscosity of about 30–40 seconds SSF at 122° F., and a minor proportion, e. g., 10–40 per cent, of a light distillate such as a diesel fuel having a specific gravity of about 25–35° API and a viscosity of about 30–50 seconds SUS at 100° F. The invention, however, is not limited to the use of any particular types of oil or mixtures thereof, and any of the oil bases known in the art may be satisfactorily employed.

The alkaline-earth metal base component may be any oxide, hydroxide or basic salt of any of the alkaline-earth metals, e. g., calcium oxide, barium hydroxide, strontium hydroxide, calcium acetate, calcium hydroxide, etc. Mixtures of alkaline-earth metal bases may also be employed. Calcium hydroxide, i. e., ordinary hydrated lime, and calcium oxide (quicklime) are preferred by reason of their low cost and general availability.

The partially saponified heat-treated rosin component may be any of the products obtained by saponifying, with an aqueous alkali-metal alkali, a wood or gum rosin which has been heat-treated under conditions of time and temperature sufficient to raise its specific rotation to a value above about +5°, and containing between about 1 and about 15 per cent by weight of free resin acids. The previously described "partially saponified decarboxylated rosin" and "partially saponified disproportionated rosin" are preferred, and if desired a mixture of these products may be employed. Such mixture may consist of between about 25 and about 75 per cent of the partially saponified disproportionated rosin and between about 75 and about 25 per cent of the partially saponified decarboxylated rosin.

The heavy metal salt component is preferably a water-soluble salt of iron, manganese or aluminum, e. g., ferric chloride, aluminum sulfate, ferrous nitrate, manganic chloride, aluminum chloride, manganous sulfate, ferric bromide, etc., although water-soluble salts of any of the metals of groups III to VIII of the periodic table of the elements may advantageously be employed. Aluminum salts are particularly useful when it is desired to prepare a fluid having high gel strength.

As previously stated, the present compositions are highly stable in the presence of alkali-metal and alkaline-earth metal salts, or combinations of such metal salts, e. g., sodium or calcium chloride, or gypsum plus sodium chloride, and if desired such salts may be included for the purpose of inhibiting the hydration of clays encountered during drilling. Also, such salts may be included in compositions to which a hydratable clay is purposely included, and will serve to prevent the hydration of such added clay. When such a clay is employed, it is preferably a high quality material such as bentonite, montmorillonite, or kaolinite, although it may be common clay such as is available in almost any locality.

PROPORTIONS

The proportions in which the various essential components are employed in preparing the new compositions may be varied between certain limits depending upon the identity of such components and the specific properties in the composition. Ordinarily, however, the partially saponified heat-treated rosin containing from about 1 to about 15 per cent of free resin acids is employed in an amount representing between about 0.5 and about 6, preferably between 1.5 and about 5 per cent by weight of the entire composition. The alkaline-earth metal base is employed in an amount representing between about 1 and about 5, preferably between 1.5 and about 4 per cent by weight of the entire composition depending upon its chemical identity. Usually it is provided in an amount slightly in excess of the quantity chemically equivalent to the resin acid soaps and heavy metal salts present. The water is provided in an amount representing between about 0.2 and about 50 per cent by weight of the entire composition. In general, compositions containing less than about 10 per cent by weight of water correspond to the so-called "oil base" drilling fluids, whereas those containing more than about 10 per cent by weight of water correspond to the so-called "emulsion-base" fluids. The proportion of heavy metal salt will vary somewhat depending upon the quantity of saponified rosin present, but usually represents between about 20 and about 400 milliequivalents per liter of the drilling fluid. When the composition includes a hydratable clay, such clay is employed in an amount representing between about 1 and about 5 per cent by weight of the entire composition, and when the composition includes an alkali-metal or alkaline-earth metal salt, such salt is employed in an amount representing between about 0.1 and about 15 per cent by weight of the entire composition.

PROCEDURE

The exact manner and order in which the saponified rosin, alkaline-earth metal base, heavy metal salt and water are dispersed in the base oil are not of primary importance, and if desired the requisite amounts of each of these ingredients may simply be added to the entire quantity of the base oil at ordinary temperatures while employing more or less vigorous agitation or stirring to secure a uniform composition. It is preferred to add the alkaline-earth metal base as the last component. The mixing operation may be carried out at the well site in conventional mud pits with agitation being effected by circulating the mixture through a pump. However, I have found that a more convenient mode of preparation which provides more highly uniform compositions consists in forming an intermediate concentrate composition which is subsequently diluted with the base oil to obtain the finished drilling fluid. Such a concentrate composition may be prepared by dispersing in 30 to 80 parts by weight of mineral oil, 10 to 40 parts by weight of partially saponified decarboxylated rosin or partially saponified disproportionated rosin or mixture of the two rosins, 5 to 30 parts by weight of water, and 0.5 to 8 parts by weight (anhydrous basis) of a soluble heavy metal salt. If desired, from 0.1 to 4 parts by weight of an alkali metatl salt may be added to suppress hydration of shales. Likewise from 0.1 to 5 parts by weight of bentonite or other clay may be added as a bridging agent, in which instance the addition of the alkali metal salt is definitely desirable. It is preferred that the resulting composition be a fluid of moderate viscosity which can be shipped and stored readily. When it is desired to prepare the finished drilling fluid, 10 parts of the concentrate are diluted with about 90 parts by volume of mineral oil and the alkaline-earth metal base is added in the desired proportion.

The following examples will illustrate several ways in which the principle of the invention has been applied, but are not to be construed as limiting the same. Unless otherwise stated, all proportions are given in parts by weight.

*Example 1*

The following composition (exclusive of heavy metal salt) was prepared:

| | Parts |
|---|---|
| Fuel oil | 87.4 |
| Gas oil | 4.8 |
| Partially saponified decarboxylated rosin | 4.0 |
| Water | 0.6 |
| Bentonite | 1.2 |
| Calcium oxide | 2.0 |

The gas oil and a small portion of the fuel oil were premixed with the rosin, heavy metal salt and bentonite to form a fluid concentrate, which was then added to the remainder of the fuel oil, followed by the calcium oxide. The fluids were agitated for 10 minutes before testing. All tests were performed at a temperature of 150° F.

| Sample No. | Heavy Metal Salt | | Viscosity, cps. | Gel Strength | | Fluid Loss, ml./30 Min. |
|---|---|---|---|---|---|---|
| | Amount, me./l. | Identity | | Initial gms. | 10 Min. gms. | |
| 1 | 0.0 | | 54 | 0 | 0 | 16.0 |
| 2 | 75 | Ferric Sulfate | 57 | 0 | 1 | 1.8 |
| 3 | 125 | do | 57 | 0 | 1 | 0.7 |
| 4 | 65 | Ferrous Sulfate | 56 | 0 | 1 | 1.4 |
| 5 | 90 | do | 58 | 1 | 3 | 1.5 |
| 6 | 90 | Ferric Chloride | 53 | 0 | 2 | 0.0 |
| 7 | 110 | Aluminum Sulfate | 56 | 0 | 1 | 1.3 |
| 8 | 110 | Manganous Sulfate | 57 | 0 | 1 | 0.2 |
| 9 | 65 | Ammonium Sulfate | 62 | 0 | 1 | 19.6 |

It will be noted that the fluid-loss-lowering effect of the added salt cannot be attributed to acidity, since ammonium sulfate, which is an acid salt, was ineffective.

*Example 2*

Six samples of the following composition (exclusive of heavy metal salt) were prepared:

| | Parts |
|---|---|
| Fuel oil | 92.3 |
| Gas oil | 1.7 |
| Dresinate 731 | 1.6 |
| Aqueous sodium chloride, 3% | 2.4 |
| Calcium oxide | 2.0 |

In each case the gas oil was mixed with a small quantity of the fuel oil, and the saponified rosin product and salt water were then stirred into the mixed oils. There was then added a heavy metal salt in the amount indicated in the following table. The remainder of the fuel oil was then added, followed by the calcium oxide. Each sample was stirred for 12 minutes, after which the rheological properties were determined at 120° F. and the fluid loss was determined at 190° F. and 1000 p. s. i. pressure.

| Sample No. | Heavy Metal Salt | | Viscosity, cps. | Gel Strength | | Fluid Loss, ml./30 Min. |
|---|---|---|---|---|---|---|
| | Amount, me./l. | Identity | | Initial | 10 Min. | |
| 1 | 0.0 | | 57 | 0 | 0 | 10.3 |
| 2 | 100 | Aluminum Chloride. | 66 | 0 | 5 | 1.6 |
| 3 | 33 | Ferric Chloride | 57 | 0 | 1 | 4.6 |
| 4 | 100 | ----do---- | 56 | 0 | 1 | 1.0 |
| 5 | 90 | Manganous Sulfate. | 55 | 0 | 1 | 1.6 |
| 6 | 130 | ----do---- | 55 | 0 | 1 | 1.7 |

It will be noted that even though no hydratable clay was present, the compositions containing heavy metal salts had excellent fluid loss properties. It should also be noted that aluminum chloride has the effect of producing a decided increase in the gel strength of the fluid.

*Example 3*

The following concentrate composition was prepared:

| | Parts |
|---|---|
| Fuel oil (P. S. 300) | 25.0 |
| Gas oil | 22.0 |
| Dresinate 731 | 17.5 |
| Aqueous sodium chloride, 3% | 28.0 |
| Bentonite | 5.0 |
| Ferric chloride hexahydrate | 2.5 |

Ten parts of this concentrate composition were diluted with 90 parts of McKittrick (California) crude oil (17° API gravity), and 2 per cent of calcium oxide was added to the diluted composition. After 15 minutes' agitation, the fluid had a 30-minute fluid loss value of 2.2 ml. at 190° F. and 1000 p. s. i. pressure, and a viscosity of 88 centipoises at 120° F. A similar mud was prepared wherein a Newhall Refinery fuel oil was substituted for the crude oil in an actual field test. After 8 hours' circulation in the bore hole the 30-minute fluid loss at 190° F. and 1000 p. s. i. pressure was 0.8 ml. and the viscosity at 120° F. was 90 centipoises.

*Example 4*

A concentrate composition was prepared from 42 parts of fuel oil, 17 parts of gas oil, 16 parts of Dresinate 731, 3 parts of ferric chloride hexahydrate, and 22 parts of 3% aqueous sodium chloride. This concentrate was then diluted with 9 times its volume of fuel oil, and 2 per cent of calcium oxide was added. The resulting drilling fluid was placed in operation in the field. After several weeks' usage the fluid had a water content of 13% as a result of rainfall and normal contamination, and had a 30-minute fluid loss value of 0.0 ml. at 190° F. A sample of the fluid was then taken, and its water content was raised to 40% by the gradual addition of 8% aqueous calcium chloride. The resulting water in oil emulsion remained stable, and had a 30-minute fluid loss value of 0.0 ml. at 190° F. Coarse, unhydrated bentonite fragments were then added to the sample in the amount of about 7% by weight. After agitation for 10 hours at 150° F. the composition was examined, and was found to be stable and the fluid loss remained zero. The bentonite fragments had retained their original shape and size, indicating that very little hydration had occurred in spite of the extremely high water content of the composition. The water content was then raised to 50%, using tap water, and the fluid was again agitated for 15 hours at 150° F. in the presence of 7 per cent coarse bentonite fragments. Again the mud and bentonite fragments remained stable and the fluid loss remained zero, indicating a remarkable resistance to water contamination.

As will be apparent to those skilled in the art, many variations are possible without departing from the scope of the invention. Such variations or modifications may include the use of viscosity modifiers, weighting agents, and various types and blends of base oils, as well as different alkaline-earth metal bases and saponified rosin products prepared from different types of partially saponified heat-treated rosins. The essence of the invention lies in the use of water-soluble heavy metal salts in combination with the base oil, water, alkaline-earth metal base, and partially saponified heat-treated rosin product to prepare drilling fluids characterized by excellent stability, the attainment of low fluid loss values immediately upon preparation, and high tolerance for aqueous or aqueous salt contamination.

Other modes of applying the principle of my invention may be employed, change being made as regards the materials or procedure employed provided the composition stated by any of the following claims, or the equivalent of such stated composition, be obtained.

I, therefore, particularly point out and distinctly claim as my invention:

1. A drilling fluid composition prepared by dispersing in a mineral oil: (1) between about 0.5 and about 6 per cent by weight of a product obtained by saponifying with an aqueous alkali-metal alkali a rosin product obtained by heat-treating rosin under conditions of time and temperature sufficient to raise its specific rotation to a value above about +5°, said saponified product containing between about 1 and about 15 per cent by weight of free resin acids; (2) between about 0.2 and about 50 per cent by weight of water; (3) between about 1 and about 5 per cent by weight of an alkaline-earth metal base; and (4) a water soluble salt of a heavy metal in an amount representing between about 20 and about 400 milliequivalents per liter of the entire composition.

2. A composition according to claim 1 and containing between about 1 and about 5 per cent by weight of an hydratable clay.

3. A composition according to claim 1 wherein the alkaline-earth metal base is hydrated lime.

4. A composition according to claim 1 wherein the alkaline-earth metal base is calcium oxide.

5. A composition according to claim 1 and containing between about 0.1 and about 15 per cent by weight of a water-soluble alkaline-earth metal salt.

6. A composition according to claim 1 wherein the saponification product is obtained from wood rosin which has been heat-treated at a temperature between about 250° C. and about 350° C. for a length of time sufficient to raise its specific rotation to a value above about +5°.

7. A composition according to claim 1 wherein the saponification product is obtained from rosin which has been treated with a hydrogenation catalyst in the absence of added hydrogen to effect a substantial degree of disproportionation.

8. A composition according to claim 1 wherein the saponification product is a partially saponified disproportionated rosin prepared by heating rosin at a temperature between about 225° C. and about 300° C. for from about 15 to about 60 minutes in the presence of a hydrogenation catalyst but in the absence of added hydrogen, distilling the resulting product and collecting a fraction distilling between about 210° C. and about 275° F. under about 5–10 mm. pressure, and saponifying said fraction with such a deficiency of aqueous sodium hydroxide that the saponified product contains between about 1 and about 15 per cent by weight of free resin acids.

9. A composition according to claim 1 wherein the saponification product is the potassium hydroxide saponification product of decarboxylated rosin comprising between about 45 and about 55 per cent by weight of potassium resin acid soaps, between about 30 and about 35 per cent by weight of unsaponifiable materials, between about 5 and about 10 per cent by weight of free resin acids, and between about 5 and about 10 per cent by weight of water.

10. A composition according to claim 1 wherein the heavy metal salt is selected from the class consisting of water soluble salts of iron, aluminum and manganese.

11. A composition according to claim 1 wherein the heavy metal salt is a water soluble salt of iron.

12. A drilling fluid composition prepared by dispersing in a mineral oil: (1) between about 1.0 and about 5 per cent by weight of a product obtained by saponifying with an aqueous alkali-metal alkali a rosin product obtained by heat-treating rosin under conditions of time and temperature sufficient to raise its specific rotation to a value above about $+5°$, said saponified product containing between about 1 and about 15 per cent by weight of free resin acids; (2) between about 0.2 and about 50 per cent by weight of water; (3) between about 1 and about 5 per cent by weight of an alkaline-earth metal base selected from the class consisting of calcium hydroxide and calcium oxide; and (4) a salt selected from the class consisting of the water-soluble salts of iron, aluminum, and manganese, in an amount representing between about 20 and about 400 milliequivalents per liter of the entire composition.

13. A composition according to claim 12 and containing between about 1 and about 5 per cent by weight of bentonite.

14. A composition according to claim 12 and containing between about 0.1 and about 15 per cent by weight of a water-soluble alkaline-earth metal salt.

15. A composition according to claim 12 and containing between about 0.1 and about 15 per cent by weight of a mixture of water soluble alkali and alkaline-earth metal salts.

16. A composition according to claim 12 wherein the saponification product consists of between about 25 and about 75 per cent by weight of partially saponified disproportionated rosin and between about 75 and about 25 per cent by weight of partially saponified decarboxylated rosin.

17. A concentrate composition, adapted to be diluted with mineral oil in a ratio of about 1 to 10, with the further addition of 1 to 5 parts by weight of an alkaline-earth base to produce an oil base drilling fluid, such concentrate comprising: (1) 30 to 80 parts by weight mineral oil, (2) 10 to 40 parts by weight of a product obtained by saponifying with an aqueous alkali metal alkali a rosin product obtained by heat-treating rosin under conditions of time and temperature sufficient to raise its specific rotation to a value above $+5°$, said saponified product containing between about 1 and about 15 per cent by weight of free resin acids, (3) 5 to 30 parts by weight of water, (4) 0–4 parts by weight of an alkali metal salt, (5) 0 to 15 parts by weight of bentonite and (6) 0.5 to 8 parts by weight (anhydrous basis) of a soluble heavy metal salt.

References Cited in the file of this patent

UNITED STATES PATENTS

| | | |
|---|---|---|
| 2,497,398 | Dawson | Feb. 14, 1950 |
| 2,542,019 | Fischer | Feb. 20, 1951 |
| 2,542,020 | Fischer | Feb. 20, 1951 |
| 2,550,054 | Fischer | Apr. 24, 1951 |
| 2,557,647 | Gates | June 19, 1951 |
| 2,607,731 | Fischer | Aug. 19, 1952 |